(12) United States Patent
Nishio et al.

(10) Patent No.: US 11,278,994 B2
(45) Date of Patent: Mar. 22, 2022

(54) METHOD OF DISASSEMBLING A COLD HEAD AND LIFTING-UP JIG

(71) Applicant: SUMITOMO HEAVY INDUSTRIES, LTD., Tokyo (JP)

(72) Inventors: Tatsuki Nishio, Nishitokyo (JP); Shuntaro Adachi, Nishitokyo (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 53 days.

(21) Appl. No.: 16/794,202

(22) Filed: Feb. 18, 2020

(65) Prior Publication Data

US 2020/0262013 A1 Aug. 20, 2020

(30) Foreign Application Priority Data

Feb. 19, 2019 (JP) .............................. JP2019-027743

(51) Int. Cl.
*B23P 15/26* (2006.01)

(52) U.S. Cl.
CPC .................................... *B23P 15/26* (2013.01)

(58) Field of Classification Search
CPC .. B23P 15/26; F25B 2309/1414; F25B 9/145; F25B 9/14; F25D 19/006; B25B 27/02; B25B 27/023; B66C 1/22
See application file for complete search history.

(56) References Cited

U.S. PATENT DOCUMENTS

| 7,000,408 B2 | 2/2006 | Mitsubori |
| 2005/0166600 A1* | 8/2005 | Mitsubori ............. F25D 19/006 62/6 |

FOREIGN PATENT DOCUMENTS

JP 4749661 B2 8/2011

* cited by examiner

*Primary Examiner* — Jun S Yoo
(74) *Attorney, Agent, or Firm* — HEA Law PLLC (57) ABSTRACT

Provided is a method of disassembling a cold head provided with a displacer that extends in an axial direction, a cylinder that accommodates the displacer, and a displacer drive unit that is fastened to the cylinder and is connected to the displacer such that the displacer is driven in the axial direction, the method including mounting a lifting-up jig onto the displacer drive unit, unfastening the displacer drive unit and the cylinder from each other, and operating the lifting-up jig such that the displacer drive unit is lifted up from the cylinder together with the displacer.

8 Claims, 11 Drawing Sheets

METHOD OF DISASSEMBLING A COLD HEAD AND LIFTING-UP JIG

RELATED APPLICATIONS

The content of Japanese Patent Application No. 2019-027743, on the basis of which priority benefits are claimed in an accompanying application data sheet, is in its entirety incorporated herein by reference.

BACKGROUND

Technical Field

A certain embodiment of the present invention relates to a method of disassembling a cold head and to a lifting-up jig.

Description of Related Art

A technique in which amounting structure provided with a sleeve is used in order to mount a cryocooler onto a cryogenic temperature vacuum chamber such as a cryostat has been known. In the cryogenic temperature vacuum chamber, for example, an object to be cooled such as a superconducting coil is accommodated and the object to be cooled is in thermal contact with an end of a sleeve. A cold head of the cryocooler is mounted into the sleeve and cools the object to be cooled via the sleeve.

In a case where the cryocooler is operated for a long period of time, maintenance of the cryocooler may need to be performed periodically. Since the cold head is somewhat movable relative to the sleeve, the cold head and the sleeve being in thermal contact with each other can be separated from each other. The object to be cooled can be maintained at a cryogenic temperature with the temperature of the cold head increased to a temperature suitable for a maintenance operation (for example, room temperature). Since it is not necessary to increase the temperature of the object to be cooled and cool the object to be cooled again for the maintenance of the cryocooler, a time taken for the maintenance of the cryocooler is shortened.

SUMMARY

According to an aspect of the present invention, there is provided a method of disassembling a cold head. The cold head is provided with a displacer that extends in an axial direction, a cylinder that accommodates the displacer, and a displacer drive unit that is fastened to the cylinder and is connected to the displacer such that the displacer is driven in the axial direction. The method includes mounting a lifting-up jig onto the displacer drive unit, unfastening the displacer drive unit and the cylinder from each other, and operating the lifting-up jig such that the displacer drive unit is lifted up from the cylinder together with the displacer.

According to another aspect of the present invention, there is provided a lifting-up jig which is used to discompose a cold head. The lifting-up jig includes a lifting-up jig main body that includes a lifting-up bolt hole and a lifting-up bolt that is screwed into the lifting-up bolt hole. The lifting-up jig main body is mountable onto a displacer drive unit of the cold head such that the lifting-up bolt is disposed to be parallel to an axial direction of the cold head. When the lifting-up jig main body is mounted onto the displacer drive unit, the lifting-up bolt is rotatable relative to the lifting-up jig main body with the lifting-up bolt not moving in the axial direction.

DETAILED DESCRIPTION

At the time of maintenance, a cold head is disassembled. For example, in the case of a GM cryocooler, a displacer is lifted up together with a displacer drive unit such as a motor and is extracted from a cylinder. A main component extracted in such a manner is subjected to maintenance such as replacement of consumable components or the entire component is replaced with a new component. Thereafter, the cold head is assembled again. In the case of a large cold head, the weight of a component to be detached is large. In addition, although depending on an installation environment for the cold head, there may be no sufficient space around the cold head. In such a case, it is difficult to perform an operation of disassembling the cold head and an operation of assembling the cold head.

It is desirable to improve a workability for maintenance of a cold head.

Note that, any combinations of the above constituent elements, and those obtained by substituting the constituent elements or expressions in the invention with each other between methods, devices, systems, or the like are also effective as an aspect of the present invention.

According to the embodiment of the present invention, it is possible to improve a workability for maintenance of a cold head.

Hereinafter, an embodiment of the present invention will be described in detail with reference to drawings. Note that, the same reference numerals are assigned to the same or similar constituent elements, members, and processes in the following description and the drawings and repetitive descriptions thereof will be omitted. In addition, the scale or shape of each part in the drawings is set for the sake of convenience of the description and is not to be limitedly interpreted unless otherwise noted. In addition, the embodiment is merely an example and does not limit the scope of the present invention. All of the features described in the embodiment and combinations thereof are not necessarily essential to the invention.

Figure 1:
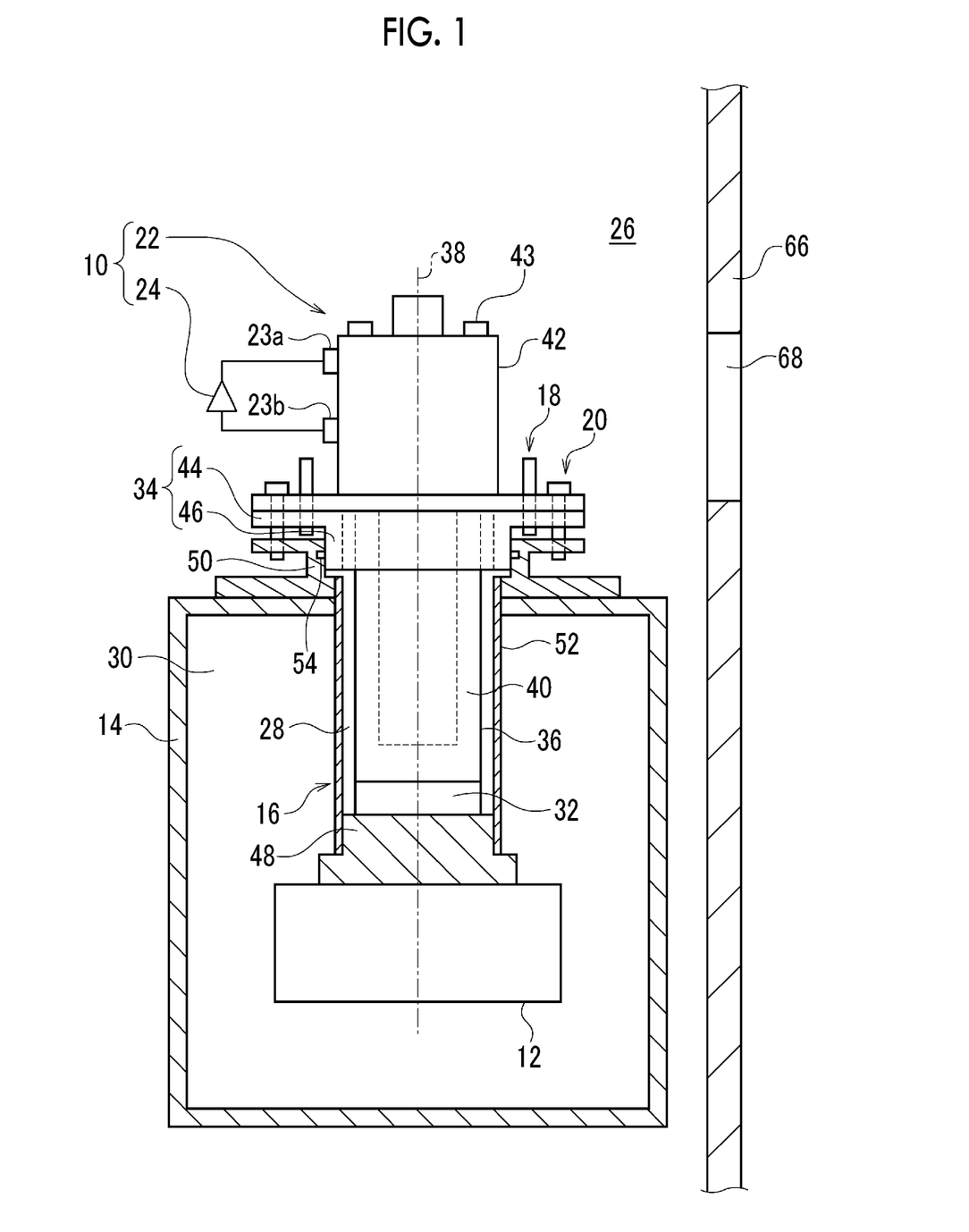
FIG. 1 is a schematic view for describing an exemplary cryocooler and a mounting structure.
Figure 2:
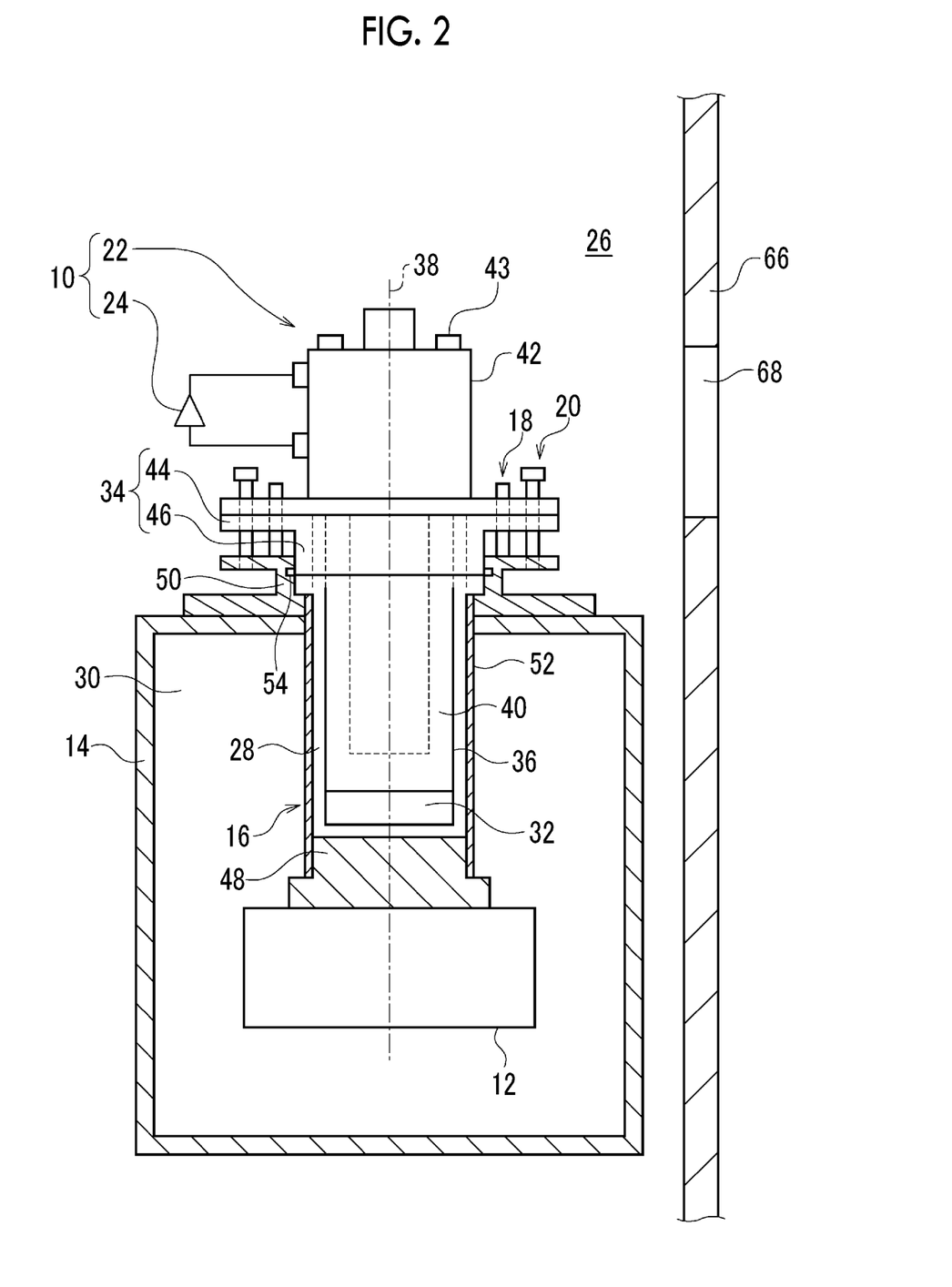
FIG. 2 is a schematic view for describing the exemplary cryocooler and the mounting structure.
Figure 3:
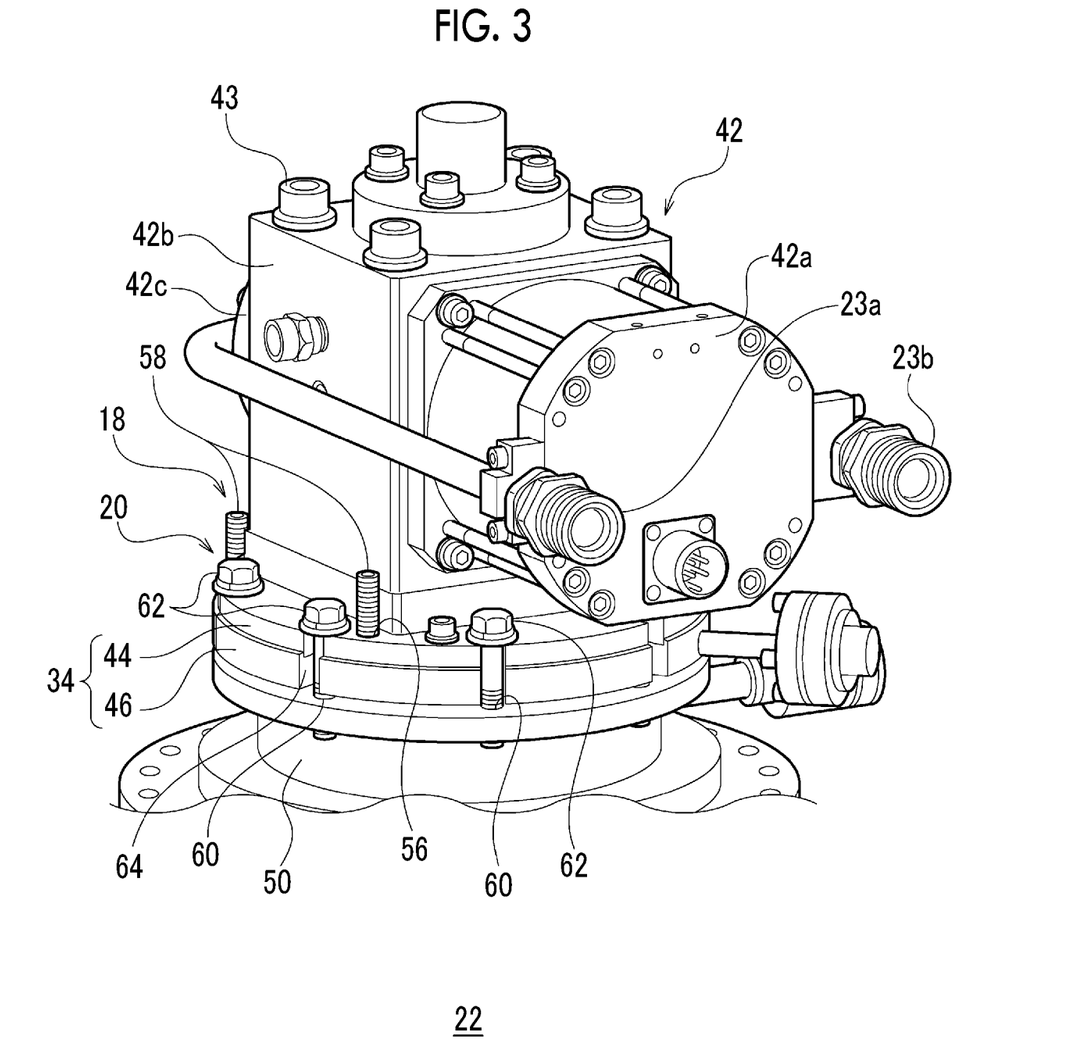
FIG. 3 is a schematic perspective view illustrating a room temperature portion of the cryocooler shown in FIG. 1.
Figure 4:
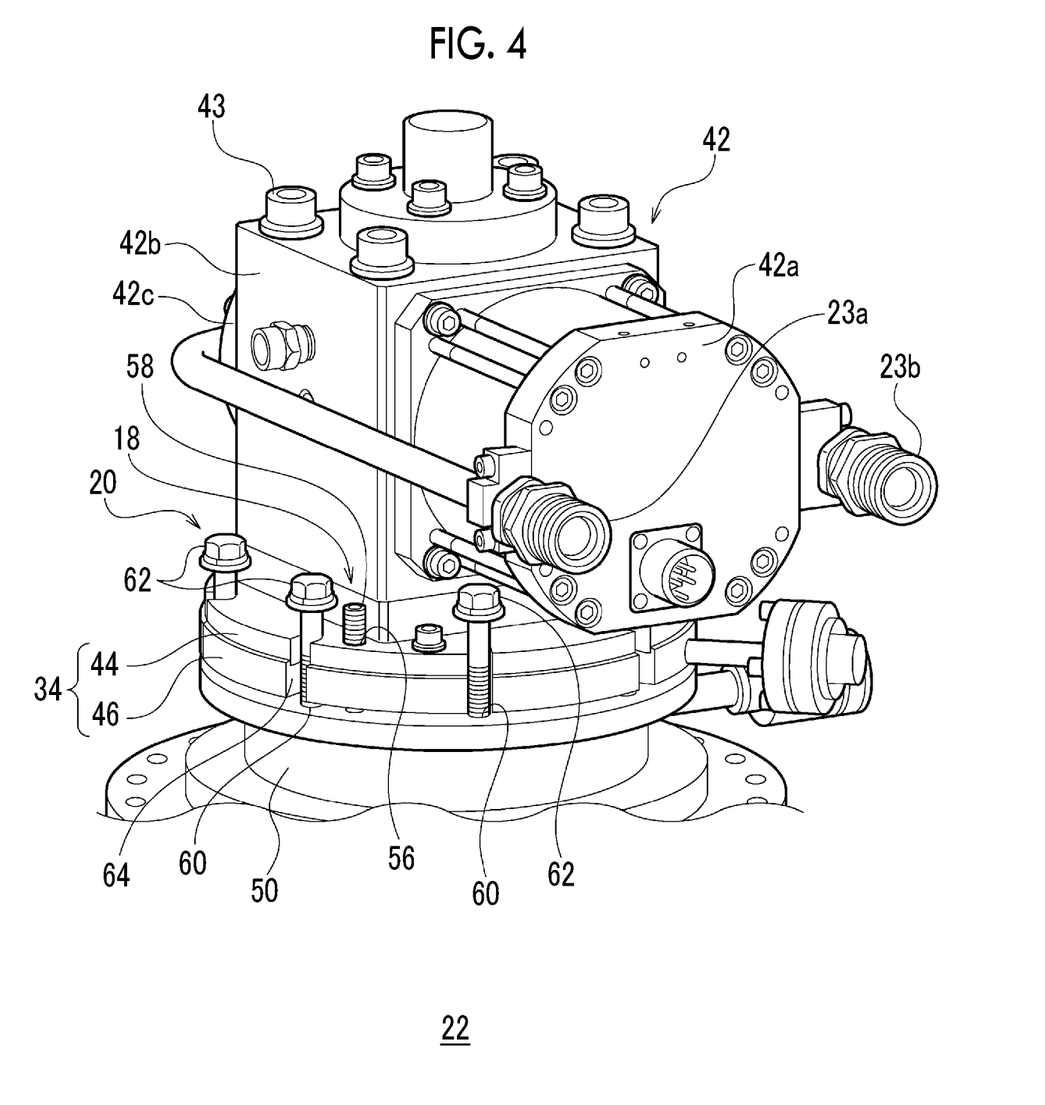
FIG. 4 is a schematic perspective view illustrating the room temperature portion of the cryocooler shown in FIG. 2.

FIGS. 1 and 2 are schematic views for describing an exemplary cryocooler 10 and a mounting structure. FIGS. 3 and 4 are schematic perspective views illustrating a room temperature portion of the cryocooler 10 shown in FIGS. 1 and 2. FIGS. 1 and 3 illustrate a state where, for example, the cryocooler 10 is thermally coupled to an object 12 to be cooled such as a superconducting coil and FIGS. 2 and 4 illustrate a state where the cryocooler 10 and the object 12 to be cooled are thermally uncoupled from each other.

The mounting structure is a tool for mounting the cryocooler 10 onto a vacuum chamber 14 (for example, cryogenic temperature vacuum chamber such as cryostat). A cooling device that cools the object 12 to be cooled is composed of the cryocooler 10 and the mounting structure. The mounting structure may be provided to a buyer together with the cryocooler 10 by a manufacturer of the cryocooler 10.

The mounting structure is provided with a cold head accommodation sleeve (hereinafter, may be simply referred to as sleeve) 16, a flange interval adjustment mechanism 18, and a flange fastening mechanism 20. The cryocooler 10 is provided with a cold head 22 and a compressor 24.

The sleeve 16 is installed in the vacuum chamber 14 such that a hermetic region 28 isolated from a surrounding environment 26 is formed between the cold head 22 and the sleeve 16. The surrounding environment 26 is, for example, an atmospheric pressure environment at a room temperature. The hermetic region 28 may be exhausted to form a vacuum and may be filled with an inactive gas such as a helium gas which is not liquefied at a cryogenic temperature.

In addition, the sleeve 16 is installed in the vacuum chamber 14 while being combined with the vacuum chamber 14 such that a vacuum region 30 is defined in the vacuum chamber 14. For example, an upper end portion of the sleeve 16 is attached to an opening portion formed in a top plate of the vacuum chamber 14 and the sleeve 16 extends to the inside of the vacuum chamber 14 from the opening portion. A lower end of the sleeve 16 is attached to the object 12 to be cooled directly or via a predetermined heat transfer member. The object 12 to be cooled is disposed in the vacuum region 30.

The cryocooler 10 is, for example, a single-stage Gifford-McMahon cryocooler (hereinafter, may be referred to as GM cryocooler). Therefore, the mounting structure is configured such that a single-stage GM cryocooler is mounted onto the vacuum chamber 14. The cryocooler 10 is not limited to the single-stage GM cryocooler and may be a two-stage GM cryocooler. In this case, the mounting structure may be configured such that a two-stage GM cryocooler is mounted onto the vacuum chamber 14. The cryocooler 10 may be other cryocoolers such as a sterling cryocooler and a pulse tube cryocooler.

The cold head 22 of the cryocooler 10 is provided with a cold head side cooling stage 32, a cold head side flange 34, and a cylinder 36. The cylinder 36 extends along a center axis 38 and connects the cold head side flange 34 to the cold head side cooling stage 32. The cold head side flange 34 and the cold head side cooling stage 32 are disposed to be coaxial with the cylinder 36. The cold head side flange 34 is provided at an upper end of the cylinder 36 and the cold head side cooling stage 32 is provided at a lower end of the cylinder 36. The cylinder 36 is, for example, a hollow cylindrical member.

The compressor 24 of the cryocooler 10 is provided to circulate a working gas (for example, helium gas) in the cryocooler 10. The compressor 24 is configured to supply a high-pressure working gas to the cold head 22, collect a low-pressure working gas, of which the pressure is lowered due to adiabatic expansion at an expansion space in the cold head 22, from the cold head 22, and increase the pressure thereof again. The cold head 22 is provided with a high-pressure port 23a serving as a working gas inlet to the cylinder 36 and a low-pressure port 23b serving as a working gas outlet from the cylinder 36. The high-pressure port 23a and the low-pressure port 23b are respectively connected to a discharge port and a suction port of the compressor 24 via, for example, pipes such as flexible hoses.

Furthermore, the cold head 22 is provided with a displacer 40 and a displacer drive unit 42. The displacer 40 is disposed in the cylinder 36 to be coaxial with the cylinder 36 and can reciprocate along the cylinder 36 in a direction along the center axis 38. The displacer drive unit 42 is fastened to the cylinder 36 and is connected to the displacer 40 to drive the displacer 40 in an axial direction. The compressor 24 and the displacer drive unit 42 are disposed in the surrounding environment 26.

In the cylinder 36, a working gas expansion space is formed between the displacer 40 and the cold head side cooling stage 32. The displacer drive unit 42 is configured to alternately switch between supply of a high-pressure working gas from the compressor 24 to the expansion space and collection of a low-pressure working gas from the expansion space to the compressor 24. A valve that controls the pressure in the expansion space is built into the displacer drive unit 42. Such a pressure control valve connects the high-pressure port 23a and the low-pressure port 23b to the expansion space in the cylinder 36 alternately. A regenerator is built into the displacer 40 and a working gas flows between the compressor 24 and the expansion space via the regenerator.

The displacer drive unit 42 is configured to appropriately synchronize a change in volume of the expansion space caused by axial reciprocation of the displacer 40 and a change in pressure in the expansion space caused by the pressure control valve with each other. Therefore, the cold head 22 can cool the cold head side cooling stage 32.

As shown in FIG. 3, the displacer drive unit 42 is provided with a motor 42a, a drive unit housing 42b, and a front surface cover 42c. The drive unit housing 42b has an approximately rectangular parallelepiped shape as a whole. The motor 42a is attached to one side surface of the drive unit housing 42b and the front surface cover 42c is attached to a side surface opposite to the one side surface. The high-pressure port 23a is connected to the front surface cover 42c. The low-pressure port 23b is connected to a side surface different from the above-described two side surfaces. The displacer drive unit 42 is fixed to the cold head side flange 34 via fastening members 43 such as bolts, for example. Fastening holes into which the fastening members 43 are inserted penetrate the drive unit housing 42b in a direction from an upper surface to a lower surface and reach the cold head side flange 34.

Although not shown, the displacer drive unit 42 includes a scotch yoke mechanism that is connected to an output shaft of the motor 42a and is accommodated in the drive unit housing 42b and a displacer driving shaft that connects the scotch yoke mechanism to the displacer 40. Rotation of the output shaft of the motor 42a is converted into axial reciprocation of the displacer driving shaft by the scotch yoke mechanism such that the displacer 40 reciprocates in the axial direction.

The cold head side flange 34 is obtained by coupling two flanges. That is, the cold head side flange 34 is provided with a cylinder top flange 44 that is formed at an upper end opening circumferential edge of the cylinder 36 while being integrated with the cylinder 36 and a transition flange 46 that is attached to a lower surface of the cylinder top flange 44. The cylinder top flange 44 can be regarded as a portion of the cylinder 36. The transition flange 46 is a member different from the cylinder 36.

The transition flange 46 includes a flange portion and a short tubular portion that extends downward in the direction along the center axis 38. The flange portion is fixed to the lower surface of the cylinder top flange 44 via fastening members such as bolts and the short tubular portion surrounds the upper end of the cylinder 36. The inner diameter of the transition flange 46 is slightly larger than the diameter of the cylinder 36 and an inner circumferential surface of the transition flange 46 and an outer circumferential surface of the cylinder 36 are not in contact with each other with a gap interposed therebetween.

The cold head side cooling stage 32 is a circular plate-shaped member or a short columnar member that is fixed to the cylinder 36 such that a lower end opening of the cylinder 36 is closed. The cold head side cooling stage 32 is formed of high thermal conductivity metal such as copper (for example, native copper) or another heat conductive material. The cold head side flange 34 and the cylinder 36 are formed of metal such as stainless steel, for example. The thermal conductivity of a heat conductive material with which the cold head side cooling stage 32 is formed is higher than the thermal conductivity of a material with which the cylinder 36 (or cold head side flange 34) is formed.

The sleeve 16 is disposed to be coaxial with the cylinder 36 such that the cylinder 36 is surrounded by the sleeve 16. The sleeve 16 is provided with a sleeve side cooling stage 48, a sleeve side flange 50, and a sleeve body 52.

The sleeve side cooling stage 48 comes into physical contact with the cold head side cooling stage 32 such that the sleeve side cooling stage 48 comes into thermal contact with the cold head side cooling stage 32. For example, the plane of contact between the sleeve side cooling stage 48 and the cold head side cooling stage 32 is flat but the shape thereof is not limited thereto. The cold head side cooling stage 32 may include a non-planar surface such as a tapered surface, an inclined surface, or an uneven surface and an inner surface of the sleeve side cooling stage 48 that is exposed to the hermetic region 28 may include a non-planar surface corresponding to the non-planar surface described above. The object 12 to be cooled is attached to an outer surface of the sleeve side cooling stage 48 that is exposed to the vacuum region 30.

Therefore, when the cold head side cooling stage 32 comes into physical contact with the sleeve side cooling stage 48, the cold head side cooling stage 32 is thermally coupled to the object 12 to be cooled via the sleeve side cooling stage 48. Accordingly, it is possible to cool the object 12 to be cooled by cooling the cold head side cooling stage 32. For example, in a case where the object 12 to be cooled is superconducting equipment such as a superconducting coil, the cryocooler 10 can cool the object 12 to be cooled to a cryogenic temperature equal to or lower than the critical temperature of a superconducting material.

The sleeve side flange 50 is coupled to the cold head side flange 34 and is disposed in the surrounding environment 26. For example, the sleeve side flange 50 is a short tube that includes flange portions at opposite ends thereof, of which a flange portion on a lower side is fixed to an upper surface of the vacuum chamber 14, and of which a flange portion on an upper side faces the flange portion of the transition flange 46 with an interval of several millimeters provided therebetween, for example.

A cylindrical portion of the sleeve side flange 50 is disposed outward of a cylindrical portion of the transition flange 46 while being positioned adjacent to the cylindrical portion of the transition flange 46 and both of the cylindrical portions are in contact with each other. A sealing member 54 for maintaining the airtightness of the hermetic region 28 is disposed between the cylindrical portion of the sleeve side flange 50 and the cylindrical portion of the transition flange 46. The sealing member 54 is, a sealing member such as an O-ring disposed at a circumferential groove formed in a tubular portion of the sleeve side flange 50.

The sleeve body 52 is a hollow cylindrical member, extends along the center axis 38 to be coaxial with the cylinder 36, and connects the sleeve side flange 50 and the sleeve side cooling stage 48 to each other. The sleeve side flange 50 is provided at an upper end of the sleeve body 52 and the sleeve side cooling stage 48 is provided at a lower end of the sleeve body 52. The sleeve side flange 50 is an annular member that extends outward in a radial direction perpendicular to the center axis 38 from an upper end opening circumferential edge of the sleeve body 52. The sleeve side cooling stage 48 is a circular plate-shaped member or a short columnar member that is fixed to the sleeve body 52 such that a lower end opening of the sleeve body 52 is closed.

The sleeve side cooling stage 48 is formed of high thermal conductivity metal such as copper (for example, native copper) or another heat conductive material. The sleeve side flange 50 and the sleeve body 52 are formed of metal such as stainless steel, for example. The thermal conductivity of a heat conductive material with which the sleeve side cooling stage 48 is formed is higher than the thermal conductivity of a material with which the sleeve body 52 (or sleeve side flange 50) is formed.

The cold head side flange 34 can slide relative to the sleeve side flange 50 in the axial direction and thus the cold head 22 can move relative to the sleeve 16 in the axial direction. The movable range thereof is a range of about several millimeters (for example, 2 to 3 millimeters). Since the sealing member 54 is provided, the hermetic region 28 remains isolated from the surrounding environment 26 even at the time of movement of the cold head 22.

FIGS. 1 and 3 illustrate a state where the cold head 22 is positioned at a lower end of the movable range and the cold head side cooling stage 32 and the sleeve side cooling stage 48 are in thermal contact with each other. FIGS. 2 and 4 illustrate a state where the cold head 22 is positioned at an upper end of the movable range, the cold head side cooling stage 32 and the sleeve side cooling stage 48 are separate from each other such that the cold head side cooling stage 32 and the sleeve side cooling stage 48 are not in thermal contact with each other.

The flange interval adjustment mechanism 18 is configured to adjust an interval between the sleeve side flange 50 and the cold head side flange 34 such that the cold head side cooling stage 32 and the sleeve side cooling stage 48 come into physical contact with each other or are separated from each other while maintaining isolation of the hermetic region 28 from the surrounding environment 26. A worker can raise or lower the cold head 22 within the movable range by operating the flange interval adjustment mechanism 18.

As shown in FIGS. 3 and 4, the flange interval adjustment mechanism 18 is provided with lifting-up bolt holes 56, formed in the cold head side flange 34 and lifting-up bolts 58 screwed into the lifting-up bolt holes 56. The lifting-up bolt holes 56 penetrate the cold head side flange 34 and when the lifting-up bolts 58 are rotated, tip ends of the lifting-up bolts 58 come into contact with the sleeve side flange 50. When the lifting-up bolts 58 are further rotated in a state where the lifting-up bolts 58 in contact with the sleeve side flange 50, an interval between the sleeve side flange 50 and the cold head side flange 34 is widened. The cold head 22 is raised from the sleeve 16 and thus the cold head side cooling stage 32 and the sleeve side cooling stage 48 being in thermal contact with each other are separated from each other as shown in FIG. 2. When the lifting-up bolts 58 are rotated reversely, the cold head side cooling stage 32 and the sleeve side cooling stage 48 come into thermal contact with each other again as shown in FIG. 1.

The flange fastening mechanism 20 is provided with fastening bolt holes 60 formed in the sleeve side flange 50 and fastening bolts 62 screwed into the fastening bolt holes 60. The fastening bolts 62 penetrate both of the cold head side flange 34 and the sleeve side flange 50. However, the fastening bolts 62 are freely fitted into the cold head side flange 34 and thus the fastening bolts 62 are not screwed into the cold head side flange 34. The fastening bolts 62 are accommodated into cutout portions 64 formed in the cold head side flange 34. The cutout portions 64 are U-shaped grooves that are formed at an outer circumferential edge of the cold head side flange 34 and extend in the axial direction. Head portions of the fastening bolts 62 may come into contact with an upper surface of the cold head side flange 34, that is, the cylinder top flange 44.

When the fastening bolts 62 are fastened, the cold head side flange 34 is fastened to the sleeve side flange 50. At this time, when the fastening bolts 62 are fastened at an appropriate fastening torque, the cold head side cooling stage 32 is pressed against the sleeve side cooling stage 48 tightly such that favorably heat transfer can be made.

In addition, in an exemplary place of use of the cryocooler 10, as shown in FIG. 1, a wall 66 is installed in the vicinity of the cold head 22. The wall 66 includes a maintenance window 68. The maintenance window 68 is positioned close to the displacer drive unit 42 (for example, positioned laterally close to displacer drive unit 42). Since the wall 66 is present, the worker cannot directly enter a space near the cryocooler 10. However, the worker can insert a hand toward the cryocooler 10 through the maintenance window 68 from the outside of the wall 66. In a situation where a maintenance operation or the like needs to be performed, the worker can manipulate the cryocooler 10 by reaching out to the cryocooler 10 via the maintenance window 68.

Figure 5:
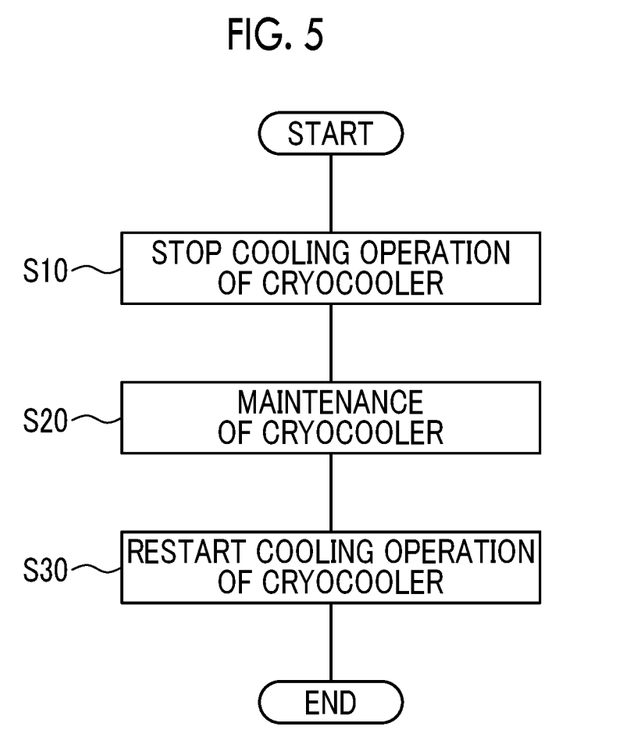
FIG. 5 is a flowchart illustrating a maintenance method for the cryocooler.

FIG. 5 is a flowchart illustrating a maintenance method for the cryocooler 10. When a timing at which maintenance of the cryocooler 10 is allowed is reached, a cooling operation of the cryocooler 10 is stopped (S10).

Immediately before the cooling operation of the cryocooler 10 is stopped or after the cooling operation of the cryocooler 10 is stopped, the worker operates the flange interval adjustment mechanism 18 and the flange fastening mechanism 20 such that the cryocooler 10 and the object 12 to be cooled are thermally uncoupled from each other. The cold head side flange 34 and the sleeve side flange 50 coupled to each other by means of the flange fastening mechanism 20 are uncoupled from each other and the cold head 22 is raised by means of the flange interval adjustment mechanism 18. Since the cold head side cooling stage 32 is separated from the sleeve side cooling stage 48, it is possible to increase the temperature of the cold head 22 while maintaining the object 12 to be cooled at a low temperature. Since the sealing member 54 is provided between the cold head side flange 34 and the sleeve side flange 50, isolation of the hermetic region 28 from the surrounding environment 26 is maintained.

Maintenance of the cold head 22 is performed (S20). Although details thereof will be described later, the displacer drive unit 42 and the displacer 40 are detached from the cold head 22. The cylinder 36 and the cold head side cooling stage 32 remain in the sleeve 16. Then, the displacer drive unit 42 and the displacer 40 after being subjected to the maintenance (or new displacer drive unit 42 and new displacer 40) are attached to the cold head 22.

Then, the cooling operation of the cryocooler 10 is restarted (S30). After the cryocooler 10 is cooled to a target cooling temperature, the worker operates the flange interval adjustment mechanism 18 and the flange fastening mechanism 20 again such that the cryocooler 10 and the object 12 to be cooled are thermally coupled to each other again. Accordingly, the cryocooler 10 can cool the object 12 to be cooled again.

Meanwhile, a large cold head 22 may be used although depending on the purpose of use of the cryocooler 10. The weights of components such as the displacer 40 and the displacer drive unit 42, which are to be detached at the time of maintenance, may also become large and it may not be easy to perform an operation of disassembling the cold head 22. In addition, there may be no sufficient space around the cold head 22 although depending on an installation environment for the cold head 22. For example, there is a case where it is not easy to access the cold head 22 like a case where the worker needs to insert a hand into the maintenance window 68 to manipulate the cold head 22 as described above. This point also makes an operation of disassembling the cold head 22 difficult.

Therefore, in the present specification, a set of jigs to be used at the time of maintenance of the cold head 22 will be proposed and description thereof will be made below. In the embodiment, the set of jigs includes a lifting-up jig 70. In addition, the set of jigs may include one or both of a displacer holding jig 80 and a displacer extraction jig 90.

Figure 6:
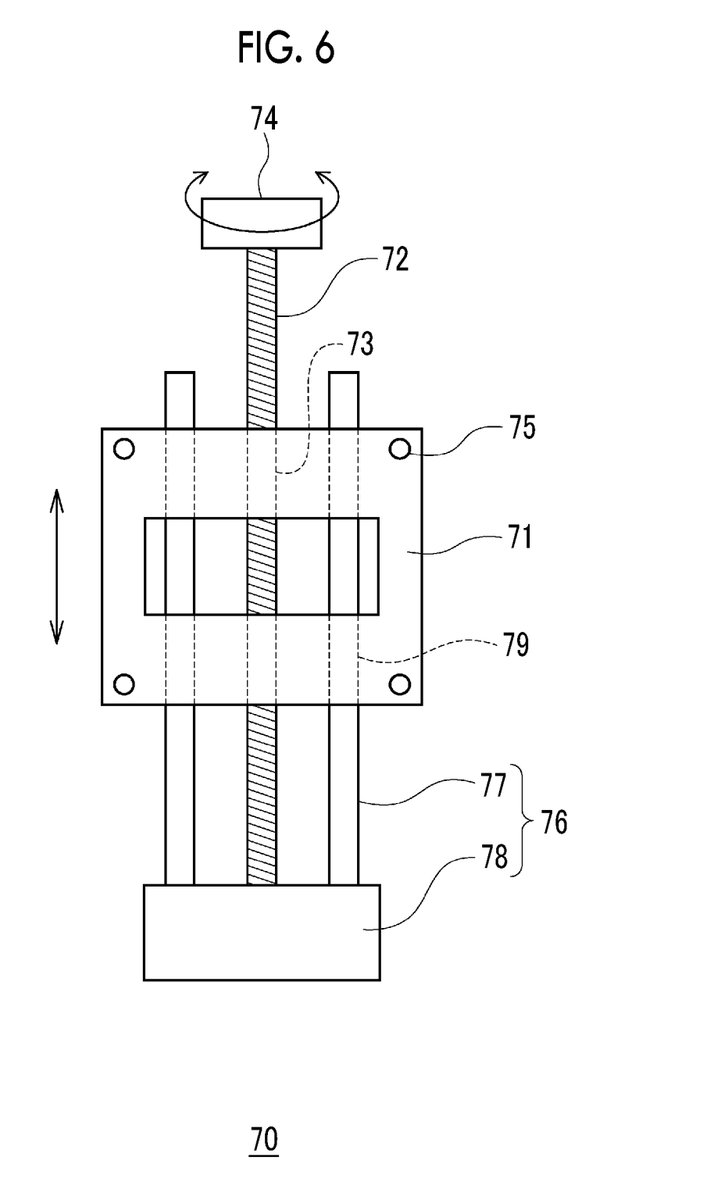
FIG. 6 is a schematic plan view illustrating a lifting-up jig according to an embodiment.

FIG. 6 is a schematic plan view illustrating the lifting-up jig 70 according to the embodiment. The lifting-up jig 70 is provided with a lifting-up jig main body 71 and a lifting-up bolt 72. The lifting-up jig main body 71 includes a lifting-up bolt hole 73. The lifting-up bolt 72 is screwed into the lifting-up bolt hole 73.

The lifting-up jig main body 71 is, for example, a plate or a block formed of appropriate metal such as stainless steel or aluminum alloy and has a rectangular shape with an opening provided at the center thereof. The lifting-up bolt hole 73 penetrates the lifting-up jig main body 71 in a direction from an upper surface to a lower surface. Accordingly, the lifting-up bolt 72 is inserted in a direction from the upper surface to the lower surface of the lifting-up jig main body 71 and a bolt head portion is positioned above the lifting-up jig main body 71. The lifting-up bolt 72 is formed of appropriate metal such as stainless steel.

A grip portion 74 is fixed to the bolt head portion. The grip portion 74 is formed of, for example, resin and the diameter thereof is considerably larger than a bolt diameter. The worker can easily rotate the lifting-up bolt 72 by holding the grip portion 74.

The lifting-up jig main body 71 is mountable onto the displacer drive unit 42 of the cold head 22 such that the lifting-up bolt 72 is disposed parallel to the axial direction of the cold head 22. As an exemplary configuration for this point, fastening holes 75 are formed in corner portions of the lifting-up jig main body 71. The fastening holes 75 penetrate the lifting-up jig main body 71 in a direction from a front surface to a rear surface. It is possible to fasten the lifting-up jig main body 71 to the displacer drive unit 42 by means of the fastening holes 75 and fastening members (for example, bolts) corresponding thereto.

When the lifting-up jig main body 71 is mounted onto the displacer drive unit 42, the lifting-up bolt 72 is rotatable relative to the lifting-up jig main body 71 with the lifting-up bolt 72 not moving in the axial direction. As an exemplary configuration for this point, the lifting-up jig 70 is provided with a guide portion 76. The guide portion 76 is provided with at least one guide rod 77 (for example, two guide rods 77) and a rod support body 78. Two guide rods 77 extend in parallel from the rod support body 78. The lifting-up jig main body 71 includes guide holes 79 into which the guide rods 77 are inserted.

The guide holes 79 are positioned with the lifting-up bolt hole 73 interposed therebetween and penetrate the lifting-up jig main body 71 in a direction from the upper surface to the lower surface. The guide rods 77 are inserted into the lifting-up jig main body 71 in a direction from the lower surface to the upper surface and the guide rods 77 extend to be parallel with the lifting-up bolt 72 with the lifting-up bolt 72 interposed therebetween. The lifting-up jig main body 71 can slide upward and downward along the guide rods 77. As with the lifting-up jig main body 71, the guide portion 76 is formed of a metal material, for example.

The rod support body 78 is positioned below the lifting-up jig main body 71 and a tip end of the lifting-up bolt 72 abuts the rod support body 78. When the rod support body 78 is supported by an appropriate supporting surface such as the cold head side flange 34, the lifting-up bolt 72 does not move relative to the lifting-up jig main body 71 in the axial direction. When the lifting-up bolt 72 is rotated in a fastening direction (for example, clockwise direction), the lifting-up jig main body 71 moves upward along the guide rods 77. On the contrary, when the lifting-up bolt 72 is rotated in a loosening direction (for example, counter-clockwise direction), the lifting-up jig main body 71 moves downward along the guide rods 77.

Figure 7:
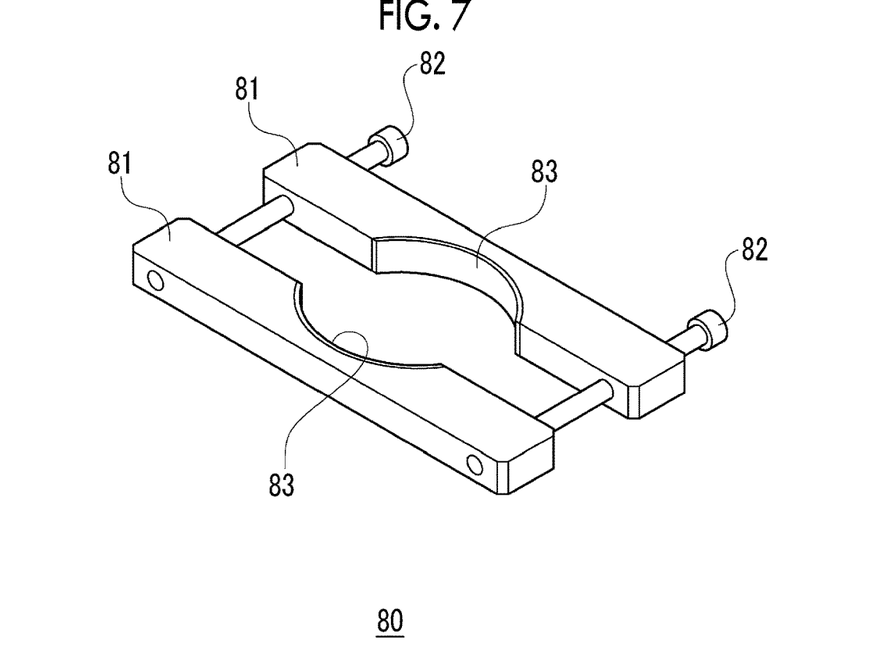
FIG. 7 is a schematic perspective view illustrating a displacer holding jig according to the embodiment.

FIG. 7 is a schematic perspective view illustrating the displacer holding jig 80 according to the embodiment. The displacer holding jig 80 is a kind of clamp and is provided with a pair of clamp plates 81 and plate fastening tools 82 such as bolts. As with the lifting-up jig 70, the displacer holding jig 80 is formed of appropriate metal such as stainless steel or aluminum alloy. For example, the clamp plate 81 has an elongated rectangular shape. The clamp plate 81 includes fastening holes at opposite ends thereof, with which the plate fastening tools 82 are engaged. The plate fastening tools 82 fasten end portions of two clamp plates 81 to each other.

A central portion of one long side of the clamp plate 81 has an ark shape and a holding material 83 is attached to the ark-shaped portion. The holding material 83 comes into contact with a surface of the displacer 40 and is formed of a resin shock absorbing material like a piece of rubber. The two clamp plates 81 are disposed to be parallel with each other such that the holding materials 83 face each other. Two plate fastening tools 82 fasten the two clamp plates 81 to each other while being positioned with the holding materials 83 interposed therebetween.

As will be described later, when the clamp plates 81 are fastened to each other by means of the plate fastening tools 82 such that the displacer 40 is interposed between the clamp plates 81, the displacer holding jig 80 is mounted onto the displacer 40. Since the holding materials 83 come into contact with the surface of the displacer 40, the displacer holding jig 80 is less likely to damage the displacer 40. In addition, a frictional force acting between the holding materials 83 and the displacer 40 becomes relatively large and a holding force of the displacer holding jig 80 is also increased.

Figure 8:
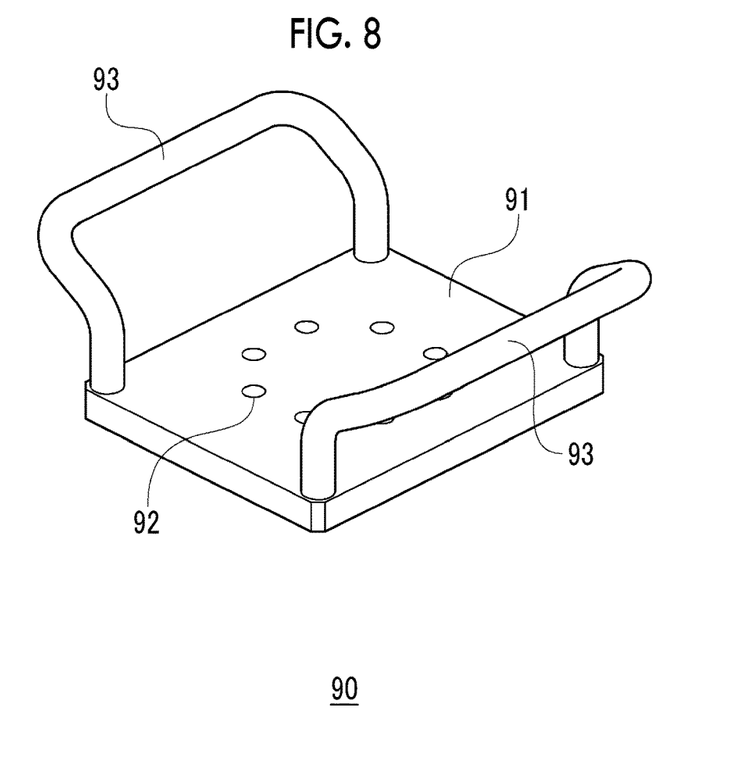
FIG. 8 is a schematic perspective view illustrating a displacer extraction jig according to the embodiment.

FIG. 8 is a schematic perspective view illustrating the displacer extraction jig 90 according to the embodiment. The displacer extraction jig 90 is provided with, for example, a rectangular raising plate 91 and several fastening holes 92 are in a central portion thereof. The raising plate 91 can be fastened to the displacer 40 by means of corresponding fastening members (for example, bolts). As with the lifting-up jig 70, the displacer extraction jig 90 is formed of appropriate metal such as stainless steel or aluminum alloy.

Handles 93 are fixed to the raising plate 91. The worker can hold the handles 93 and raise the displacer extraction jig 90 together with the displacer 40. For example, the number of the handles 93 is two and the handles 93 are fixed to two facing sides of the raising plate 91, respectively. Each handle 93 is positioned above and outward of a side of the raising plate 91 and extends along the side. Since the number of the handles 93 is two, it is easy for the worker to grip the handles 93 with both hands. Alternatively, it is easy for two workers to grip the handles 93 respectively.

Next, a method of disassembling the cold head 22 by using the above-described jigs will be described. When the cooling operation of the cryocooler 10 is stopped, working gas pipes are detached from the high-pressure port 23a and the low-pressure port 23b. Although the inside of the cold head 22 is filled with working gas, the filling pressure thereof is considerably lower than the atmospheric pressure. Therefore, a gas collection tool is mounted into any of the high-pressure port 23a and the low-pressure port 23b such that the working gas in the cold head 22 is collected and the pressure is decreased to be approximately equal to the atmospheric pressure. Then, as will be described later, the lifting-up jig 70 is mounted onto the displacer drive unit 42 and an operation of detaching the displacer 40 is started. At this time, the cold head 22 is mounted into the sleeve 16.

Figure 9:
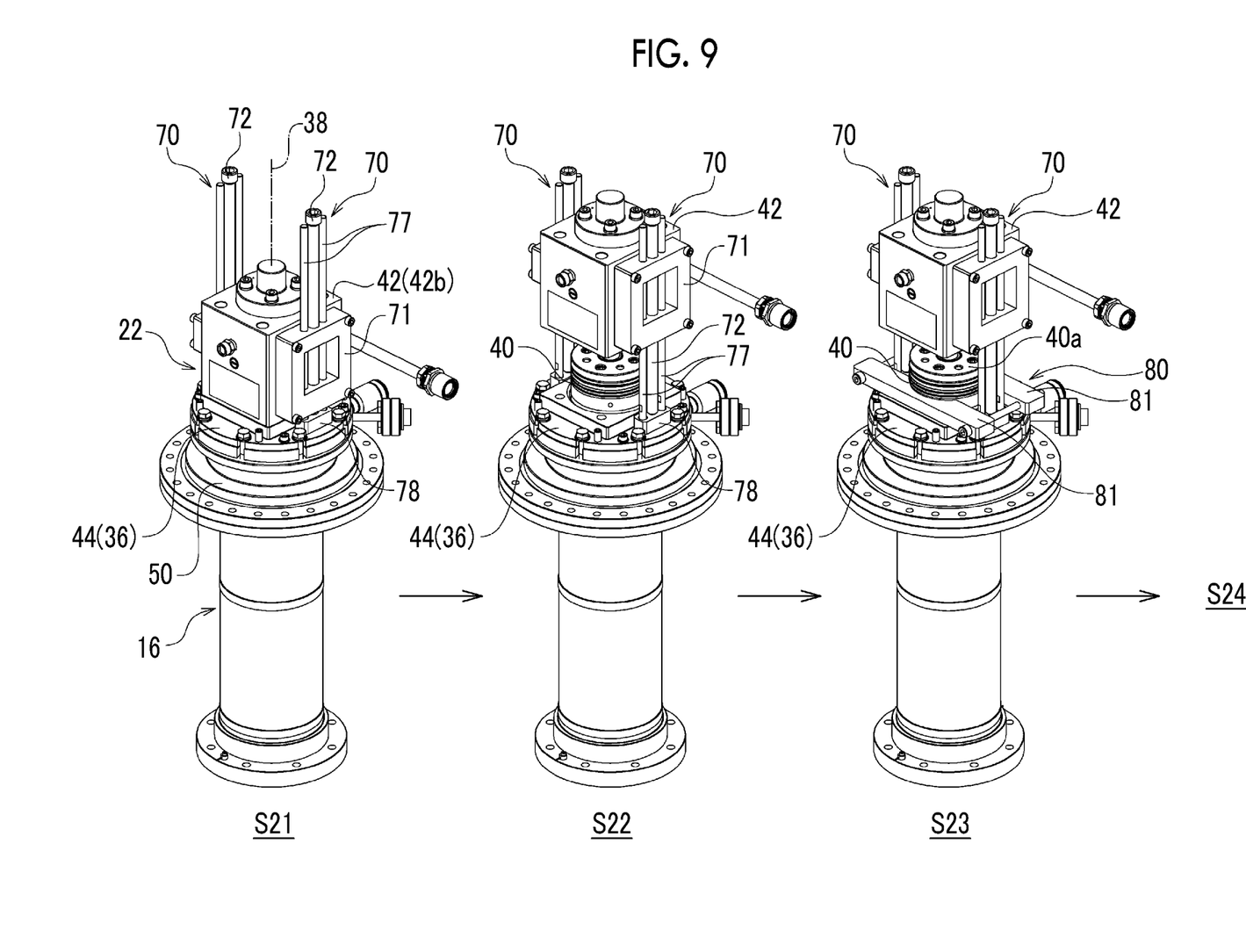
FIG. 9 is a schematic view illustrating a method of disassembling a cold head according to the embodiment.
Figure 10:
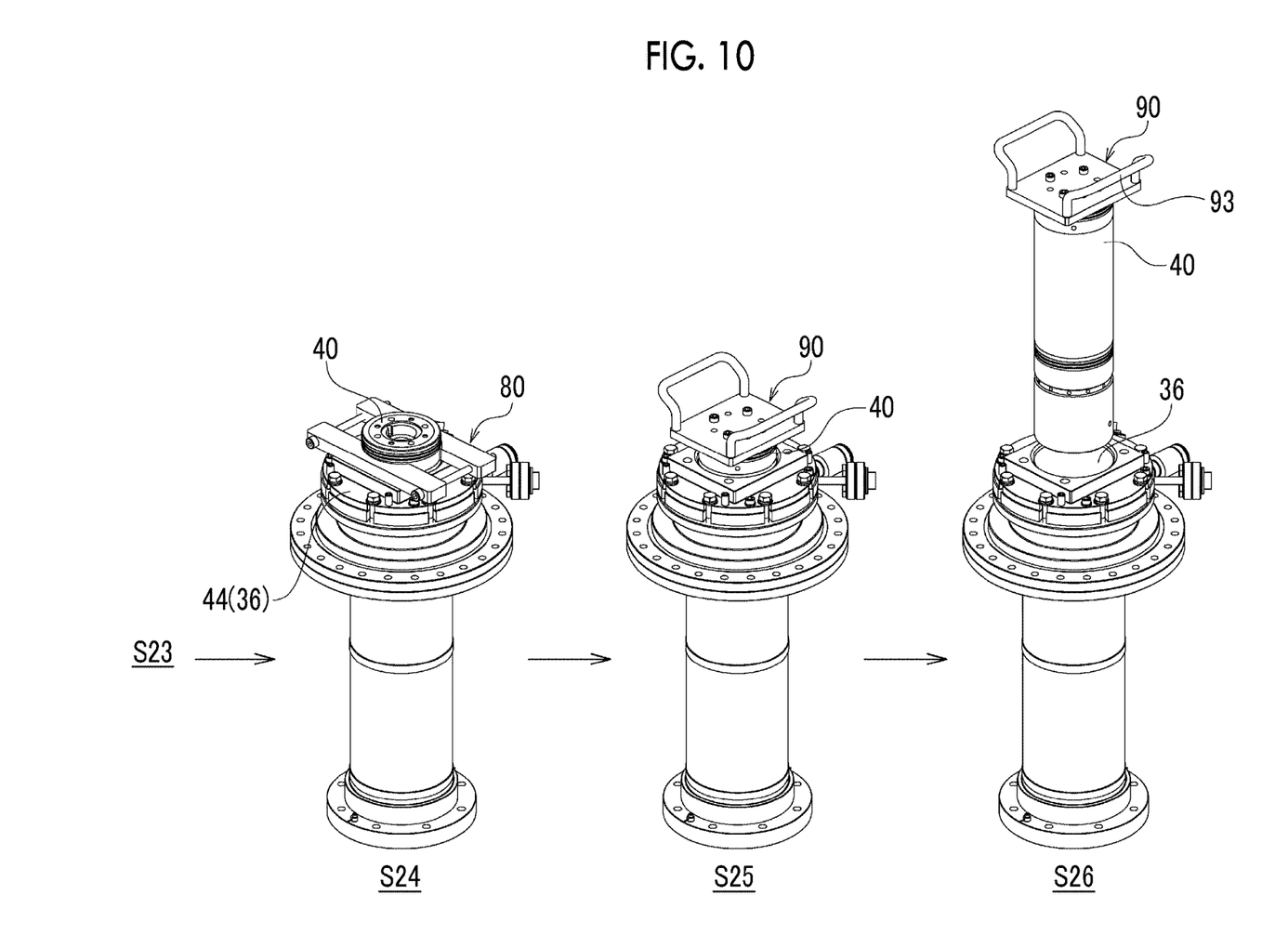
FIG. 10 is a schematic view illustrating the method of disassembling the cold head according to the embodiment.

FIGS. 9 and 10 are schematic views illustrating a method of disassembling the cold head 22 according to the embodiment. FIG. 9 illustrates the first half of the method of disassembling the cold head 22 and FIG. 10 illustrates the second half of the method of disassembling the cold head 22.

As shown in FIG. 9, the method of disassembling the cold head 22 is started from a step of mounting the lifting-up jigs 70 onto the displacer drive unit 42 (S21). A lifting-up jig mounting step (S21) includes attaching the lifting-up jig main bodies 71 to the displacer drive unit 42 such that the lifting-up bolts 72 are disposed to be parallel with the axial direction of the cold head 22.

As described above, while the cryocooler 10 is being operated, the motor 42a and the front surface cover 42c are in a state of being attached to the drive unit housing 42b. The motor 42a is detached from the drive unit housing 42b and lifting-up jig main body 71 of the lifting-up jig 70 is mounted instead of the motor 42a. In addition, the front surface cover 42c is detached from the drive unit housing

42b and the lifting-up jig main body 71 of another lifting-up jig 70 is mounted instead of the front surface cover 42c. In this manner, two lifting-up jigs 70 are mounted onto opposite sides of the displacer drive unit 42. At this time, the guide portion 76 (rod support body 78) of each lifting-up jig 70 is placed on an upper surface of the cylinder top flange 44.

When the lifting-up jigs 70 are mounted, the displacer drive unit 42 and the cylinder 36 are unfastened from each other. The fastening members 43 (refer to FIG. 1) are detached and thus the drive unit housing 42b and the cylinder top flange 44 are unfastened from each other.

Next, the lifting-up jigs 70 are operated such that the displacer drive unit 42 is lifted up from the cylinder 36 together with the displacer 40 (S22). A lifting-up jig operating step (S22) includes rotating the lifting-up bolts 72 relative to the lifting-up jig main bodies 71 with the lifting-up bolts 72 not moving in the axial direction.

Since the tip ends of the lifting-up bolts 72 abut the rod support bodies 78, the lifting-up bolts 72 do not move in the axial direction. Since the lifting-up bolts 72 are screwed into the lifting-up jig main bodies 71, when the lifting-up bolts 72 are rotated in the fastening direction (for example, clockwise direction), the lifting-up jig main bodies 71 move upward along the guide rods 77. Since the lifting-up jig main bodies 71 are attached to the drive unit housing 42b, the displacer drive unit 42 is lifted up from the cylinder 36 together with the displacer 40. By uniformly operating the right and left two lifting-up jigs 70, it is possible to restrain the displacer 40 from being inclined with respect to the cylinder 36 while the displacer 40 is being lifted up.

Then, the displacer holding jig 80 is mounted onto the displacer 40 (S23). The displacer holding jig 80 is mounted onto the displacer 40 such that the displacer 40 is interposed between the two clamp plates 81. The clamp plates 81 are placed on the cylinder top flange 44. An upper lid 40a of the displacer 40, which is also called an upper cover, is fixed to an end of a displacer drive shaft of the displacer drive unit 42.

As shown in FIG. 10, the displacer drive unit 42 is detached from the displacer 40 together with the lifting-up jigs 70 (S24). The upper lid 40a of the displacer 40 and the displacer 40 are unfastened from each other and thus it becomes possible to detach the displacer drive unit 42 from the displacer 40.

At this time, the displacer 40 is held by the displacer holding jig 80 in a state of being lifted up from the cylinder 36. Even when the displacer drive unit 42 is detached from the displacer 40, the displacer 40 does not fall into the cylinder 36.

The displacer extraction jig 90 is mounted onto the displacer 40 (S25). Instead of the upper lid 40a, the displacer extraction jig 90 is attached to the displacer 40. In an example shown in the drawing, the displacer holding jig 80 is detached at this time. However, the displacer holding jig 80 may remain mounted onto the displacer 40.

The displacer extraction jig 90 is raised together with the displacer 40 and the displacer 40 is extracted from the cylinder 36 (S26). The worker can hold the handles 93 and raise the displacer extraction jig 90 together with the displacer 40. In this manner, the displacer 40 is detached from the cold head 22 and the method of disassembling the cold head 22 according to the embodiment is terminated.

The displacer 40 is subjected to maintenance such as replacement of consumable components. Alternatively, the extracted displacer 40 may be replaced with a new displacer. Then, the cold head 22 is assembled again. The assembly may be performed by performing the above-described operation of disassembling the cold head in a reverse order.

Figure 11:
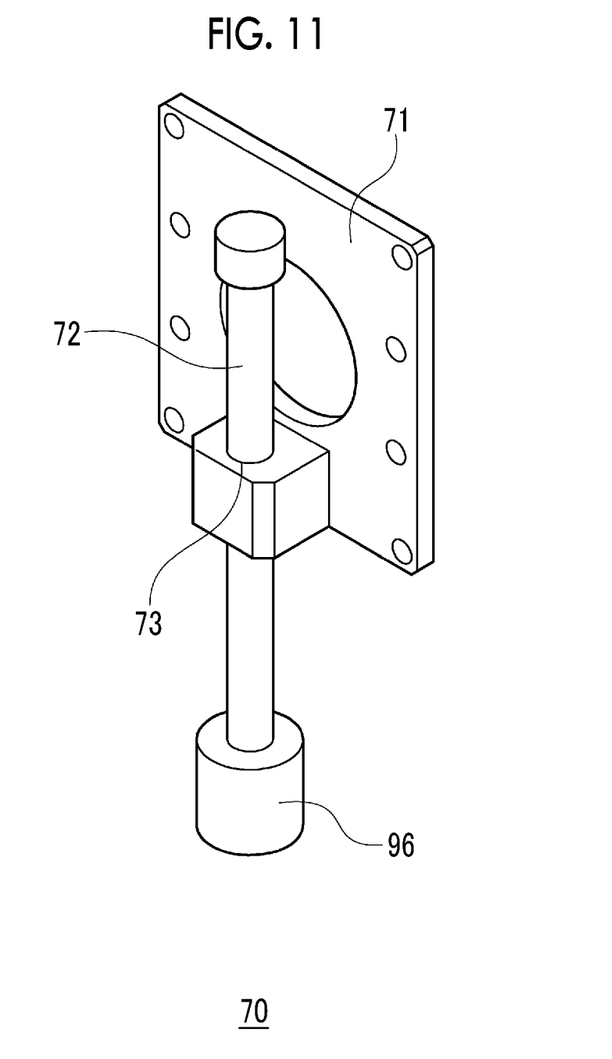
FIG. 11 is a schematic perspective view illustrating another example of the lifting-up jig according to the embodiment.
Figure 12:
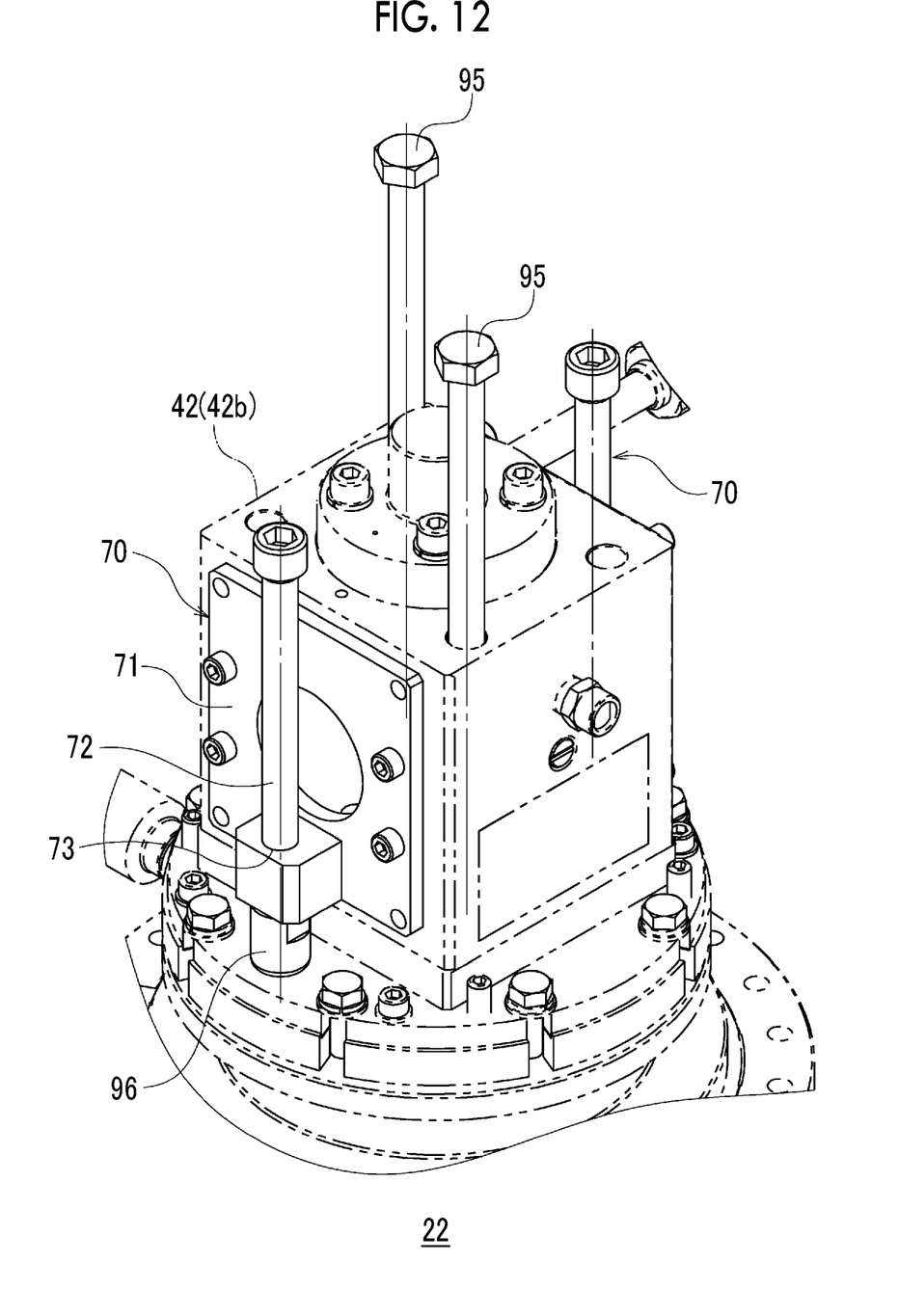
FIG. 12 is a schematic perspective view illustrating a state where the lifting-up jig shown in FIG. 11 is mounted onto the cold head.

FIG. 11 is a schematic perspective view illustrating another example of the lifting-up jig 70 according to the embodiment. FIG. 12 is a schematic perspective view illustrating a state where the lifting-up jig 70 shown in FIG. 11 is mounted onto the cold head 22.

The lifting-up jig 70 is provided with the lifting-up jig main body 71 that includes the lifting-up bolt hole 73 and the lifting-up bolt 72 that is screwed into the lifting-up bolt hole 73. The lifting-up jig main body 71 is mountable onto the displacer drive unit 42 of the cold head 22 such that the lifting-up bolt 72 is disposed parallel to the axial direction of the cold head 22. When the lifting-up jig main body 71 is mounted onto the displacer drive unit 42, the lifting-up bolt 72 is rotatable relative to the lifting-up jig main body 71 with the lifting-up bolt 72 not moving in the axial direction.

However, the lifting-up jig 70 does not include a guide portion such as a guide rod. Instead, a guide member 95 (for example, may be bolt) functioning as a guide rod is inserted into a fastening hole of the drive unit housing 42b. In addition, a protection cap 96 is attached to the tip end of the lifting-up bolt 72. The protection cap 96 is formed of, for example, resin. The protection cap 96 is caused to abut the cylinder top flange 44 or a surface of a structure near the cylinder top flange 44. Accordingly, the lifting-up bolt 72 does not move in the axial direction. By rotating the lifting-up bolt 72, it is possible to lift up the lifting-up jig main body 71 and the displacer drive unit 42.

In a cold head disassembling method in the related art, the lifting-up jig 70 is not used. If there is no lifting-up jig 70, it is necessary for the worker to continuously support the weights of the displacer 40 and the displacer drive unit 42 himself or herself when the displacer drive unit 42 is lifted up. In a case where the cold head 22 is large and the displacer 40 or the displacer drive unit 42 is heavy or in a case where a working space is narrow, a burden on the worker performing an operation of disassembling the cold head 22 becomes large.

However, according to the method of disassembling the cold head 22 in the embodiment, the lifting-up jigs 70 are mounted onto the displacer drive unit 42. Therefore, it is possible to support the displacer drive unit 42 with the lifting-up jigs 70 when the displacer drive unit 42 is lifted up. Accordingly, a burden on the worker in an operation of disassembling the cold head 22 is reduced and a workability for maintenance of the cold head 22 is improved.

In addition, according to the method of disassembling the cold head 22 in the embodiment, it is possible to easily lift up the displacer 40 and the displacer drive unit 42 from the cylinder 36 by means of a simple operation of rotating the lifting-up bolts 72.

Furthermore, the displacer holding jig 80 is used. Even when the displacer 40 and the displacer drive unit 42 are disconnected from each other, the displacer 40 can be maintained in a state of being lifted up from the cylinder 36. Accordingly, the worker does not need to support the displacer 40 by human power such that the displacer 40 does not fall into the cylinder 36. Therefore, a burden on the worker is reduced and a workability for maintenance of the cold head 22 is improved.

In addition, since the displacer extraction jig 90 is used, it is also easy to perform an operation of extracting the displacer 40 from the cylinder 36.

Hereinabove, the present invention has been described based on the examples. The present invention is not limited to the embodiment and it will be understood by those skilled in the art that various design changes can be made, various modification examples can be implemented, and the modification examples also fall within the scope of the present invention. Various features described in relation to a certain embodiment can be applied to other embodiments. New embodiments resulting from combinations of embodiments and will provide the advantages of the embodiments combined.

In the above-described embodiment, two lifting-up jigs 70 are used. However, the present invention is not limited thereto. Only one lifting-up jig 70 may also be used. In this case, for example, the lifting-up jig 70 may be mounted onto the drive unit housing 42*b* instead of the front surface cover 42*c* and the motor 42*a* may remain attached to the drive unit housing 42*b*.

Based on the embodiment, the present invention has been described with specific words and phrases. However, the embodiment merely shows one aspect of the principles and applications of the present invention and regarding the embodiment, various modification examples and changes of arrangement can be made without departing from the idea of the present invention defined in claims.

It should be understood that the invention is not limited to the above-described embodiment, but may be modified into various forms on the basis of the spirit of the invention. Additionally, the modifications are included in the scope of the invention.

What is claimed is:

1. A method of disassembling a cold head provided with a displacer that extends in an axial direction, a cylinder that accommodates the displacer, and a displacer drive unit that is fastened to the cylinder and is connected to the displacer such that the displacer is driven in the axial direction, the method comprising:
   mounting a lifting-up jig onto the displacer drive unit;
   unfastening the displacer drive unit from the cylinder; and
   operating the lifting-up jig such that the displacer drive unit is lifted up from the cylinder together with the displacer,
   wherein the lifting-up jig is provided with a lifting-up jig main body that includes a lifting-up bolt hole and a lifting-up bolt that is screwed into the lifting-up bolt hole,
   wherein the mounting of the lifting-up jig includes attaching the lifting-up jig main body to the displacer drive unit such that the lifting-up bolt is disposed to be parallel to the axial direction of the cold head, and
   wherein the operating of the lifting-up jig includes rotating the lifting-up bolt relative to the lifting-up jig main body with the lifting-up bolt not moving in the axial direction.

2. The method according to claim 1, further comprising:
   detaching the displacer drive unit from the displacer together with the lifting-up jig.

3. The method according to claim 1, further comprising:
   mounting a displacer holding jig onto the displacer; and
   detaching the displacer drive unit from the displacer together with the lifting-up jig,
   wherein the displacer is held by the displacer holding jig in a state of being lifted up from the cylinder.

4. The method according to claim 1, further comprising:
   mounting a displacer extraction jig onto the displacer; and
   raising the displacer extraction jig together with the displacer such that the displacer is extracted from the cylinder.

5. A method of disassembling a cold head provided with a displacer that extends in an axial direction, a cylinder that accommodates the displacer, and a displacer drive unit that is fastened to the cylinder and is connected to the displacer such that the displacer is driven in the axial direction, the method comprising:
   mounting a lifting-up jig onto the displacer drive unit;
   unfastening the displacer drive unit from the cylinder;
   operating the lifting-up jig such that the displacer drive unit is lifted up from the cylinder together with the displacer; and
   detaching the displacer drive unit from the displacer together with the lifting-up jig.

6. The method according to claim 5, further comprising:
   mounting a displacer holding jig onto the displacer,
   wherein the displacer is held by the displacer holding jig in a state of being lifted up from the cylinder.

7. The method according to claim 5, further comprising:
   mounting a displacer extraction jig onto the displacer; and
   raising the displacer extraction jig together with the displacer such that the displacer is extracted from the cylinder.

8. A method of disassembling a cold head provided with a displacer that extends in an axial direction, a cylinder that accommodates the displacer, and a displacer drive unit that is fastened to the cylinder and is connected to the displacer such that the displacer is driven in the axial direction, the method comprising:
   mounting a lifting-up jig onto the displacer drive unit;
   unfastening the displacer drive unit from the cylinder;
   operating the lifting-up jig such that the displacer drive unit is lifted up from the cylinder together with the displacer;
   mounting a displacer extraction jig onto the displacer; and
   raising the displacer extraction jig together with the displacer such that the displacer is extracted from the cylinder.

* * * * *